(12) United States Patent
Kandasamy et al.

(10) Patent No.: US 8,250,552 B2
(45) Date of Patent: Aug. 21, 2012

(54) HIGH EFFICIENCY COMPILATION FRAMEWORK FOR STREAMLINING THE EXECUTION OF COMPILED CODE

(75) Inventors: Madhusudanan Kandasamy, TamilNadu (IN); Manish Gupta, Yorktown Heights, NY (US); Vidya Ranganathan, Karnataka (IN); Dibyendu Das, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 744 days.

(21) Appl. No.: 12/272,401

(22) Filed: Nov. 17, 2008

(65) Prior Publication Data

US 2010/0125835 A1    May 20, 2010

(51) Int. Cl.
G06F 9/45 (2006.01)
(52) U.S. Cl. .......................................... 717/151; 717/140
(58) Field of Classification Search .......... 717/140–161; 718/108
See application file for complete search history.

(56) References Cited

U.S. PATENT DOCUMENTS

| | | | |
|---|---|---|---|
| 6,622,300 B1 * | 9/2003 | Krishnaswamy et al. | 717/130 |
| 7,478,373 B2 * | 1/2009 | Bond et al. | 717/138 |
| 7,574,346 B2 * | 8/2009 | Bond et al. | 703/26 |
| 2002/0052727 A1 * | 5/2002 | Bond et al. | 703/26 |
| 2005/0102129 A1 * | 5/2005 | Bond et al. | 703/26 |
| 2006/0143707 A1 | 6/2006 | Song et al. | |
| 2006/0184669 A1 | 8/2006 | Vaidyanathan et al. | |
| 2007/0169024 A1 | 7/2007 | Drepper | |

OTHER PUBLICATIONS

Bernaschi, et al. "Operating system enhancements to prevent the misuse of system calls", Date: 2000, pp. 174-183, ACM, New York, USA. http://portal.acm.org/citation.cfm?id=352624&dl=ACM&coll=portal.

Lam, et al. "Accurate and automated system call policy-based intrusion prevention", pp. 1-10. http://www.ecsl.cs.sunysb.edu/tr/TR193.pdf , 2006, IEEE.

Rajagopalan, et al. "System call monitoring using authenticated system calls", IEEE Transactions on Dependable and Secure Computing, Date: Jul.-Sep. 2006, pp. 216-229, vol. 3, Issue No. 3, IEEE Computer Society. http://csdl2.computer.org/persagen/DLAbsToc.jsp?resourcePath=/dl/trans/tq/&toc=comp/trans/tq/2006/03/q3toc.xml&DOI=10.1109/TDSC.2006.41.

Rubini Alessandro, "Making System Calls from Kernel Space". http://www.linux-mag.com/id/651?r=s , Nov. 2000, Linux Magazine.

US-H2196, Jonathan Tester, Published Jul. 3, 2007, "Method For Intercepting Specifice System Calls In A Specific Application From Applications Space For Security".

Rajagopalan, et al; Cassyopia: Compiler Assisted System Optimization; Proceedings of HotOS IX: The 9th Workshop on Hot Topics in Operating Systems; Usenix Association; 2003.

* cited by examiner

*Primary Examiner* — Wei Zhen
*Assistant Examiner* — Qing Chen
(74) *Attorney, Agent, or Firm* — Robert C. Rolnik; David A. Mims

(57) ABSTRACT

A method and system for reducing processing overhead during execution of a code block in a high efficiency compilation framework. The method identifies second code blocks within the code block and separates them out from the first code block during compilation. Further, during compilation, the system converts the second code blocks to kernel program modules, in a form recognizable by the system kernel. The compilation is followed by execution of the first code block, with the compiled object code of the first code block being executed in user mode and the kernel program modules being executed in kernel mode.

20 Claims, 6 Drawing Sheets

HIGH EFFICIENCY COMPILATION FRAMEWORK FOR STREAMLINING THE EXECUTION OF COMPILED CODE

TECHNICAL FIELD

The present invention relates generally to enhancement of compilation efficiency in operating systems, and in particular to a method and system for streamlining the execution of compiled code.

BACKGROUND OF THE INVENTION

Computer applications have become ubiquitous, and their continued operation demands attention to efficiency. In such an environment, applications exchanging data perform data intensive operations and system calls. For example, each time an application shifts from a user mode operation to one performed in kernel mode, the system saves the user mode context, that is, the current state and settings are written to a memory, the kernel operation is performed, and the context is restored. These data intensive operations and system calls consume overhead in terms of data read and write operations. In turn, increased user mode—kernel mode boundary crossing events result in a corresponding increase in context switches from user mode to kernel mode, creating performance overhead, which in turn boosts consumption of CPU cycles and reduces overall processing speed.

Contemporary technologies describe a number of proposed solutions to reduce system overhead by reducing the number of context switches. For example, one such technique calls for clustering system calls. In this approach, execution profiles of program segments are used to identify groups of system calls that can be replaced by a single call implementing their basic functionality, thereby reducing number of user mode—kernel mode boundary crossings. The clustering of system calls drastically reduces the total number of system calls and the cost associated for processing each system call by reducing the number of context switches required while crossing the user mode—kernel mode boundary. These approaches are limited, however, only allowing clustering of system calls having similar execution profiles.

Without a method and system that can reduce system overhead due to data intensive operations the promise of this technology may never be fully achieved.

SUMMARY OF THE INVENTION

According to one embodiment of the invention, a method for accelerating execution of a first code block is described. The method, first, identifies a second code block within the first code block, based on specific patterns, during compilation of the first code block. Pattern identification proceeds using a predefined set of rules. Once such patterns are identified, the identified second code block is separated from the first code block. Subsequently, during compilation, a compiler converts the second code block to corresponding object code module. Further, a Kernel Program Module (KPM) generation module executes the object code module into kernel program module, in a form recognizable by system kernel. Thereafter, the compiler creates glue code (defined below) corresponding to the second code block for copying data values of variables from the first code block to the kernel program module. Execution of the first code block, with the compiled object code of the first code block being executed in a user mode and the kernel program module being executed in a kernel mode, follows the compilation. The compiler again creates glue code corresponding to the executed kernel program module and copies modified values of the variables back into the executed kernel program module. As soon as execution is completed in the kernel mode, the glue code facilitates updating the first code block (being executed in the user mode), following which, execution in the user mode resumes.

In a further embodiment, a system for reducing processing overhead during execution of a code block is described. The system has a compiler, a KPM generation module, a virtual processor, and a memory. The compiler identifies one or more specific patterns in the code block and converts the identified patterns into corresponding object code module. The KPM generation module executes the object code module in a user mode and executes the object code module into kernel program module, in a form recognizable by system kernel. The virtual processor executes the kernel program module in a kernel mode. The memory synchronizes execution of the code block segments being executed separately in the user mode and the kernel mode.

DETAILED DESCRIPTION OF THE INVENTION

The following detailed description is made with reference to the figures. Embodiments are described to illustrate the present invention, not to limit its scope, which is defined solely by the claims. Those of ordinary skill in the art will recognize a variety of equivalent variations on the description that follows.

Figure 1:
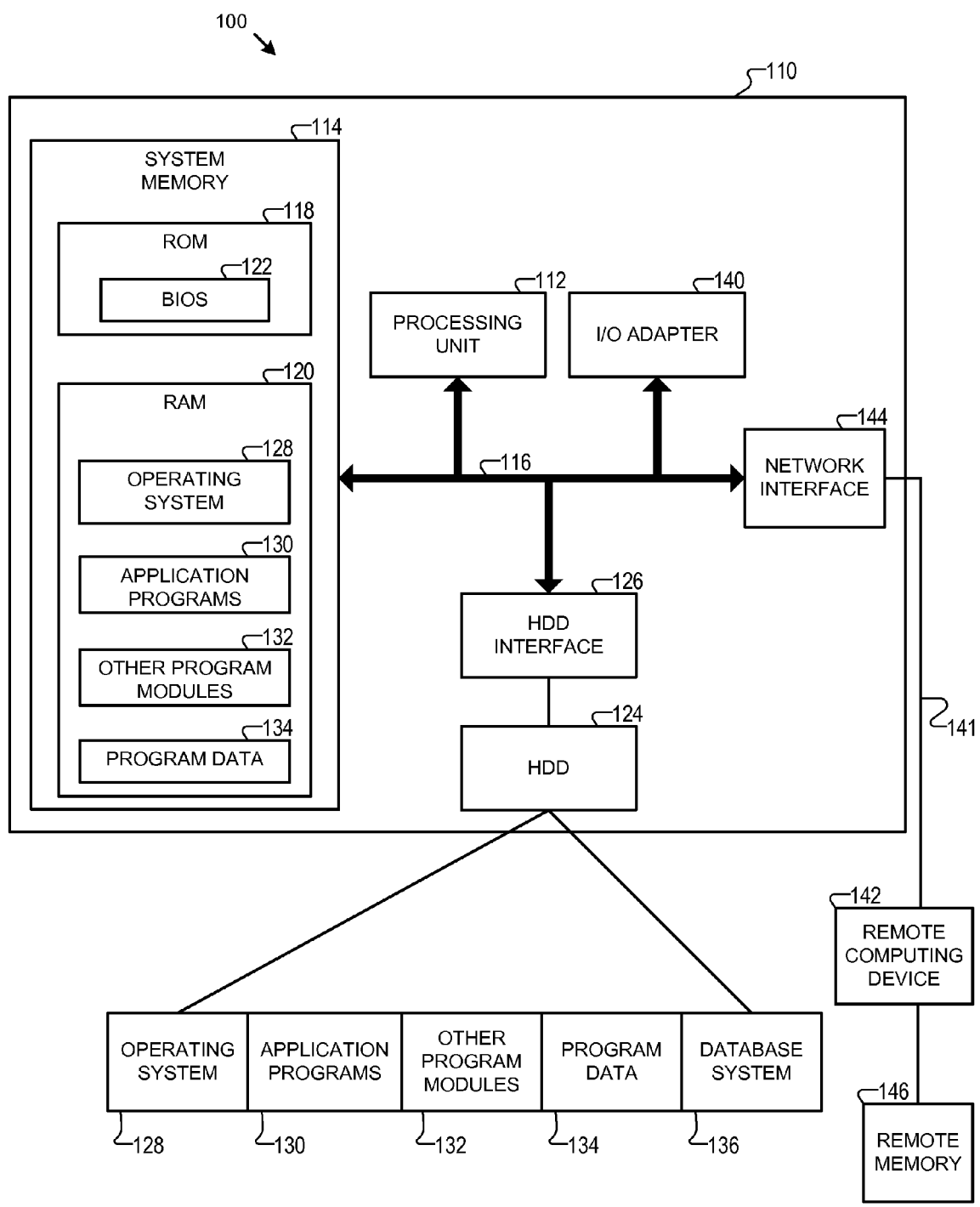
FIG. 1 illustrates an exemplary computing environment for implementing the claimed invention.

With reference to FIG. 1, a system 100 for implementing the claimed invention includes a computing device 110, which in turn includes a processing unit 112, a system memory 114, and a system bus 116 that couples various system components including the system memory 114 to the processing unit 112. The computing device 110 may be a personal computer, a router, a server, a network PC, a peer device, or other general purpose computing devices. The system bus 116 may be any of several types of bus architectures, including a memory bus, a memory controller, a peripheral bus, and a local bus using any of a variety of bus architectures, such as PCI. The system memory 114 includes a Read Only Memory (ROM) 118 and a Random Access Memory (RAM) 120. A Basic Input/Output System (BIOS) 122, containing the basic routines that help to transfer information between elements within the computing device 110, such as during start-up, is stored in the ROM 118. The computing device 110 further includes a Hard Disk Drive (HDD) 124 as computer-readable storage media. The HDD 124 is connected to the system bus 116 by an HDD interface 126. The HDD 124 provides a non-volatile storage for computer-readable instructions, data structures, program modules, and other data for the computing device 110. Although the exemplary environment described herein employs the HDD 124, it should be appreciated by those skilled in the art that other types of computer-readable storage media, which can store data that is accessible by computer, such as RAM, ROM, removable magnetic disks, removable optical disks, and the like may also be used in the exemplary operating environment.

A number of program modules may be stored on the HDD 124, including an operating system 128, one or more application programs 130, other program modules 132, program data 134, and a database system 136. The operating system 128, the one or more application programs 130, the other program modules 132 and program data 134 may be loaded onto the system memory 114 and specifically onto the RAM 120 during the functioning of the computing device 110. A user may provide commands and information through input devices, such as a keyboard, and receive output through peripheral output devices, such as monitor, speaker, printer, etc. These input and output devices are often connected to the processing unit 112 through an I/O adapter 140 coupled to the system bus 116.

In a networked environment, the computing device 110 may be connected to a remote computing device 142 through a network interface card 144. It will be appreciated that the network connections shown are exemplary, and any conventional means 141 of establishing communications links between the computers, such as a local area network, wide are network or wireless connection, may be used. In a networked environment, program modules depicted relative to the computing device 110, or its components, may be stored in a remote memory 146. The remote computing device 142 may be a personal computer, a router, a server, a network PC, a peer device, or other common network device.

Figure 2:
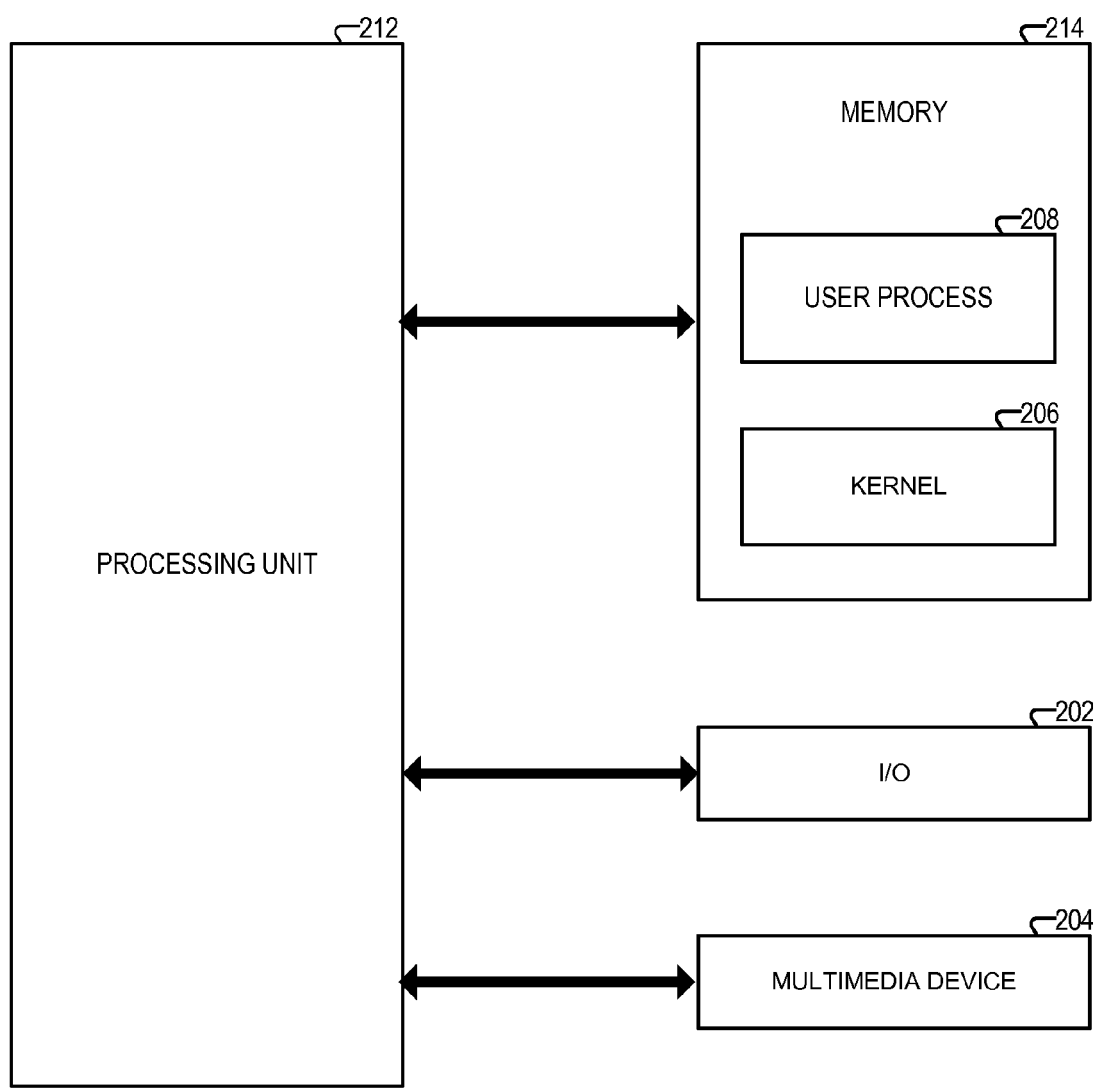
FIG. 2 illustrates hardware components of a computer system for a high efficiency compilation as set out in the claimed invention.

FIG. 2 illustrates physical and logical components of the computing device 110 shown in FIG. 1, as adapted in the practice of the claimed invention. The computing device 110 includes the processing unit 112 and the system memory 114, the system memory 114 being a computer-readable storage medium. The processing unit 112 may be operatively connected to an I/O device 202 and a multimedia device 204. Although FIG. 2 shows only a single processing unit 212, the computing device 110 may include a number of processors, used by separate processes or tasks, each having one or more execution threads. The terms, task and process, used in this description, refer to executing entities within any conventional computing system to process user applications and other execution threads.

As with conventional computer systems, the computing device 110 includes an operating system and one or more application programs. In one embodiment, the operating system may be UNIX®, but it should be appreciated by a person in the art that any other operating system chosen from those available in the art may be used, such as AIX®, LINUX®, etc. The system memory 114, shown as memory 214 in FIG. 2, includes a portion of the operating system referred to as a kernel 206, and a user process 208. Although only one user process 208 is shown, there may be a number of user processes running in the computing device 110. The computing device 110, which includes the processing unit 112 and the associated operating system, contain two levels of resources and protections. These levels are termed user (or non-privileged) mode and kernel (or privileged) mode. The operating system and the computer processor prevent an execution thread from directly accessing certain system resources and performing certain security-critical operations, while being executed in user mode.

In the kernel mode, the operating system implements critical operating system components to facilitate execution of critical or sensitive functions, such as virtual memory management, responding to interrupts and exceptions, and scheduling execution threads. Such components of the operating system, which execute from kernel mode, collectively form the kernel 206.

The processing unit 112 employs both modes during execution of an application program. User processes run in user mode and make calls to system or kernel functions that execute in kernel mode. When a user process calls a system function, the processor traps the call and switches the current execution thread from user mode to kernel mode. The kernel 206 takes control of the execution thread, validates the arguments received from the execution thread, and then executes designated system functions. The operating system switches the execution thread back to user mode before returning control to the user process 208. In this way, only system functions are allowed to execute from kernel mode. On the other hand, application threads and other execution threads running in kernel mode have direct access to hardware resources of the computing device 110. As a result, an execution thread running in kernel mode has to make lesser number of data copy switches and context switches as compared to a similar execution thread running in user mode.

Figure 3:
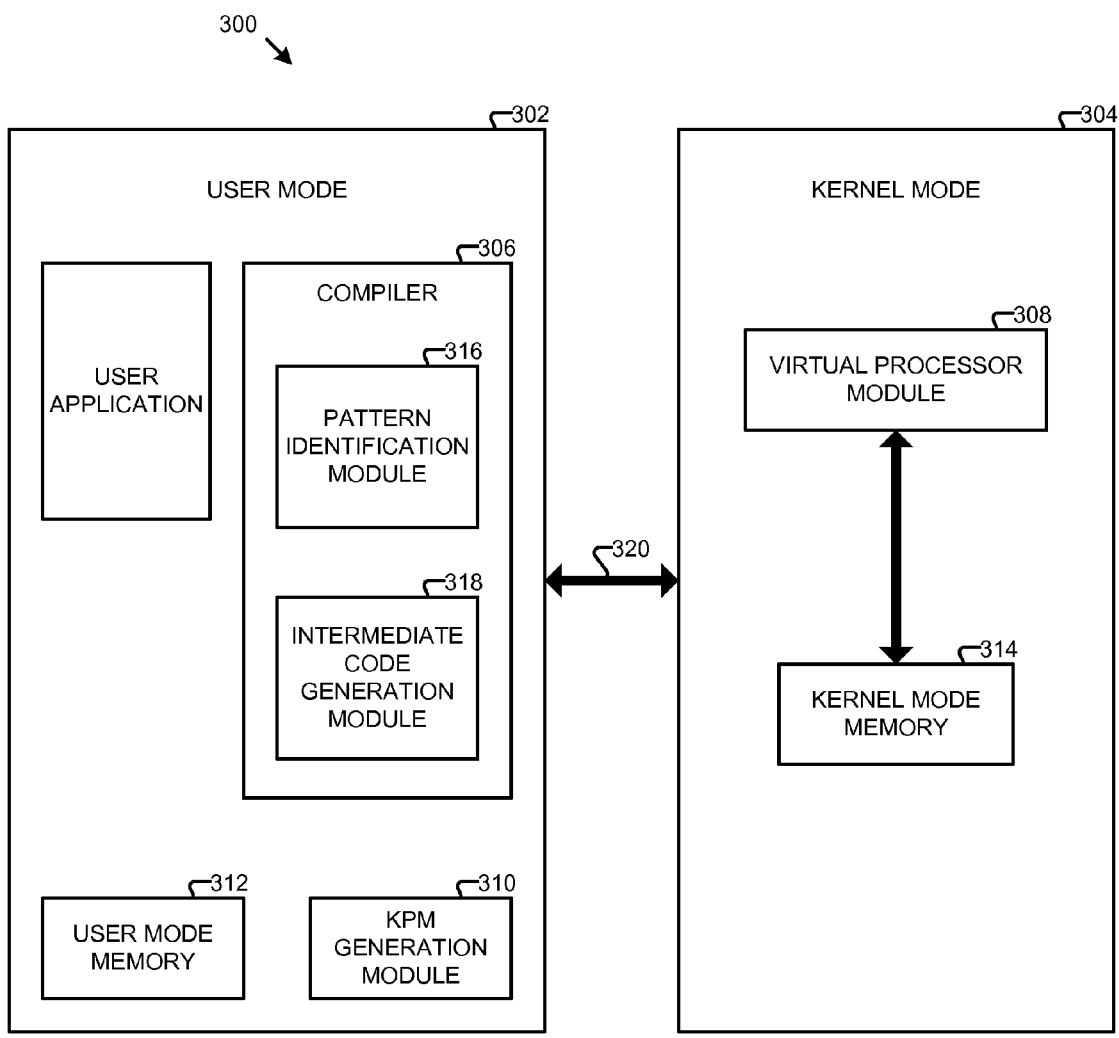
FIG. 3 illustrates an exemplary architecture for the high efficiency compilation framework for the embodiment of the invention shown in FIG. 2.

FIG. 3 is an exemplary illustration of a high efficiency compilation framework 300 as employed in the claimed invention. The high efficiency compilation framework 300 employs both the user mode 302 and the kernel mode 304. In general, the high efficiency compilation framework 300 facilitates accelerated execution of a code block of source code and improves performance of an application program by reducing total number of context switches and data copy switches between the user mode 302 and the kernel mode 304.

The user mode 302 includes a compiler 306, a kernel program module (KPM) generation module 310, and a user mode memory 312. The kernel mode 304 includes a virtual processor module 308 and a kernel mode memory 314. In one embodiment, the user mode memory and the kernel mode memory may be part of same physical memory. A system call mechanism 320 facilitates communication between the kernel mode 304 and the user mode 302.

In one embodiment, the compiler 306 is configured to identify one or more specific patterns within a first code block and separate the specific patterns from the first code block. The compiler 306 further includes a pattern identification module 316 and an intermediate code generation module 318. The pattern identification module 316 identifies a specific pattern (a second code block) within the first code block based, at least in part, on a predefined set of rules. The specific pattern is suitable for kernel mode operation. During the operation of this embodiment on a given first code block, the pattern identification module 316 may generate multiple second code blocks. The first code block may be a user application, for example, containing a number of second code blocks within its body, many or all of which may make multiple data-intensive calls. The second code blocks include patterns, such as loops, and similar system calls.

In one embodiment, the pattern identification module 316 identifies the second code blocks based, at least in part, on a predefined set of rules, such as occurrence of system calls in a loop or within a group, in the first code block. The pattern identification module 316 in conjunction with the compiler 306 may further analyze the identified patterns to determine whether they are suitable for kernel mode execution. It should be appreciated by those skilled in the art that the set of rules can be further configured and modified, in a number of ways. In one example, the pattern identification module 316 may maintain a list of all possible system calls supported by the virtual processor module 308. If any system call present in the list occurs in the first code block, the system call is considered for further analysis. In a further embodiment, if a block of instructions occurs between consecutive system calls in the first code block, the pattern identification module 316 considers the block of instructions for further analysis, depending on the number of instructions between the consecutive system calls. If the number of instructions in the block of instructions is larger than a configurable threshold, the pattern identification module 316 may not consider the block of instructions for further analysis. Further, in another embodiment, the pattern identification module 316 may identify second code blocks having data relationships between system calls, such as read( )-write( ), and the like. It will be clear to those in skilled the art that the predefined set of rules can be built into the system in a relatively inflexible manner, or the rules can be made easily configurable by users.

The compiler 306 instructs the intermediate code generation module 318 to compile the identified second code blocks into corresponding object code modules. It will be apparent to those skilled in the art that the intermediate code generation module 318 may be any code generator that converts internal representation of a source code into a form that can be readily executed by a processor. The intermediate code generation module 318 performs a determination operation on the second code blocks being compiled into object code modules by performing one or more feasibility checks.

During the determination operation, the compiler 306, in conjunction with the intermediate code generation module 318, verifies all variable references within the second code blocks. The verification serves to determine whether a safe duplication of the variable references is possible in the kernel mode 304, during execution of the KPMs in the kernel mode 304. A KPM is a representation of an identified code block in a format recognizable by a virtual processor module. The KPMs are directly executable in the kernel mode 304. The variable references used in a second code block may be dependent on other variables for inputs, and those variable references may be used in other sections of the first code block. This dependency might result in possible failure in safe duplication of the variable references in the kernel mode 304. If, for example, the second code block uses the variable references and the variable references cannot be safely duplicated into a kernel program module, an execution failure of the first code block could result. It is therefore required to consider dependencies, as the real values of the variable references are not known until they are actually executed. Upon determining that the second code blocks are suitable for accelerated execution in the kernel mode 304, the compiler 306 automatically tags the identified second code blocks, from start point to end point, separately.

The KPM generation module 310 executes the object code modules to generate KPMs, in a form recognizable by the kernel mode 304. The KPM generation module 310 generates a separate KPM for each object code module, wherein each object code module corresponds to an identified second code block. In an embodiment, the KPM generation module 310 is a processor and executes the object code modules to generate KPMs. In one embodiment, the KPM generation module 310 may be a part of the compiler 306.

The virtual processor module 308 resides in the kernel mode 304 and executes the kernel program modules present in the kernel mode 304. In one embodiment, the virtual processor module 308 may be an interpreter configured to execute kernel program modules in the kernel mode 304. The compiler 306 instantiates a process to call the virtual processor module 308, and creates a glue code corresponding to the first code block. The glue code creates duplicate copies of variable references present in the first code block in the user mode 302 by copying the values or data areas of the variable references from the first code block and providing the copied values to the kernel program modules for execution purposes. Additionally, the glue code also facilitates copying back of values of the variable references from the executed kernel program modules in the kernel mode 304 to the variable references present in the first code block in the user mode 302. It should be appreciated by a person skilled in the art that, the glue code may be any code that does not contribute any functionality towards meeting requirements of a user application, but instead serves to glue together different parts of the user application that would not otherwise be compatible. The glue code is described in more detail in conjunction with FIG. 5 and FIG. 6.

In an embodiment, the virtual processor module 308, as shown in the following code segment described below, accepts a KPM as an argument. The KPM is then executed on an instruction by instruction basis, where the KPM is structured as an array having individual instructions stored as array elements. In the code segment set out immediately below, the virtual processor module 308 has a switch structure, having a separate processing sub-module for each individual class of instruction. For example, sub-module ARITHMETIC processes an arithmetic operation and sub-module FUNCTION processes system calls. Additionally, the virtual processor module 308 can execute instructions including, but not limiting to, system calls, function calls, conditional control statements, branch statements, arithmetic operations, data types, and the like. Persons skilled in the art will understand that any type of control flow methodology may be adopted, allowing the value of a variable or expression to control the flow of program execution.

One embodiment of the virtual processor module 308 could be structured as follows:

```
LOOP START
  switch ( instruction.opcode)
  {
    /*Resolve variable references and get the pointers stored in op1
    and op2.*/
    case ARITHMETIC:      /*Execute arithmetic operation given in
                           Operator on operands.*/
      break;
    case GOTO:             /*Jump to the instruction address given
                           in the tag*/
      continue;
    case FUNCTION:         /*Identify the function type whether it is
                           system call or application library
                           call(libcsys).
                           Call the respective function/syscall based
                           on the function id*/
      break;
    case IF :              /*Execute the relational expression, if the
                           result is true then execute the instruction
                           inside the if block, if the result is false jump
                           to the instruction after the if block*/
  }
LOOP END
```

Figure 4:
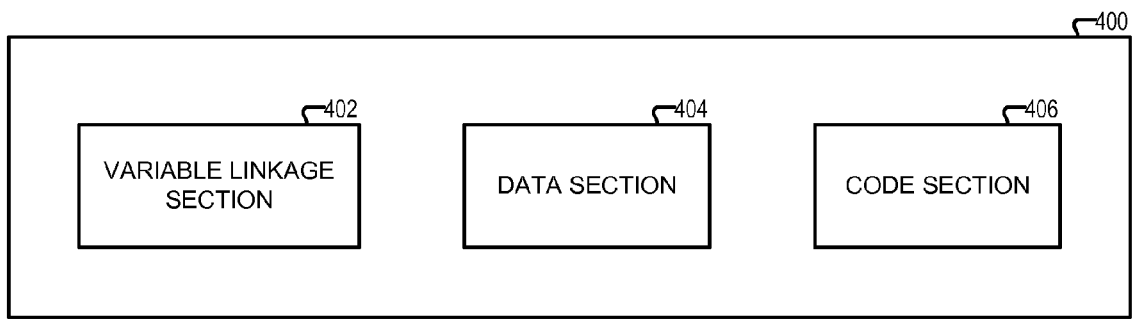
FIG. 4 illustrates an exemplary kernel program module as employed in the claimed invention.

FIG. 4 illustrates a kernel program module 400. In an embodiment, the KPM 400 may be an executable object structure, which can be executed by the virtual processor module 308. As illustrated in FIG. 4, the KPM 400 includes three major sections, a variable linkage section 402, a data section 404 and a code section 406. The variable linkage section 402 includes entries for each variable reference used in a second code block, which may be used during execution of the KPM 400 in the kernel mode 304. Additionally, the compiler 306, in conjunction with the KPM generation module 310, translates all variable references and their associated values from the user mode memory 312 of the user application to the data section 404 of the KPM 400, and stores the translation in the variable linkage section 402, by using glue code. The data section 404 is used as a data segment in the KPM 400. All variable references being used in the second code block have a corresponding space allocated to them in the data section 404 of the KPM 400. The data section 404 is interactively coupled to the variable linkage section 402 to create a mapping of all variable reference names and indexes being used in the second code block, in the variable linkage section 402.

The code section 406 is used as a code segment for including a set of instructions corresponding to the kernel program module 400. The code section 406 includes transformed instructions in a form recognizable to the kernel mode 304, corresponding to each instruction within the second code block. The transformed instructions are stored as an array of instructions, and the virtual processor module 308 executes the transformed instructions in an order defined in the array. In an embodiment, the code section 406 has interface definitions for each instruction in the corresponding second code block to facilitate the flexibility of representing a code block, which may or may not be a system call, in the KPM 400. The presence of interface definitions further facilitates the transformation of instructions between consecutive system calls in a second code block, into the kernel KPM 400. Apart from system calls, the presence of interface definitions facilitates the transformation of instructions related to other code blocks.

In accordance with an embodiment, the KPM 400, as shown in the code segment below, has a structure type object datatype. The datatype of the KPM 400 has segments to store data required for the KPM 400 to get executed in the kernel mode 304. As shown in the following code section, the KPM 400 is shown as a structure datatype "kerpgm". Kerpgm includes two more structure datatypes: namely, "dataseg" and "codeseg". Dataseg is used as the data section 404 to store all sorts of data entries required for successful execution of the KPM 400. The data entries may include a space corresponding to all variable references occurring in a second code block, such as a structure variable in the following code segment. The codeseg structure includes transformed instructions, in a kernel-recognizable form, corresponding to each instruction within the second code block. The codeseg structure may be, for example, the code section 406 in FIG. 4. In the following code segment, the structure datatype instruction implements the code segment. The instruction datatype may include definitions for specific instructions, such as "arithexpr" or "functioncall", and the like, as shown in the following code segment. Additionally, the KPM 400 may have an array type structure to store every instruction within the second code block, in its kernel executable form. It will be apparent to one skilled in the art that any datatype other than structure may also be used.

An embodiment of a segment of the KPM 400 used to dynamically store the transformed instructions of a second code block is now presented:

```
struct kerpgm{
    struct dataseg ds;
    struct codeseg cs;
}
struct dataseg {
    char * databuf;
    struct variable var[ ];
}
struct variable {
    int dtype;
    int offset;
    int idx;
}
struct codeseg
{
    instruction inst[ ]
};
struct instruction {
    char opcode;
    union operand
        {
            struct arithexpr   ae;
            struct functioncall fc;
            struct gotostmt g;
        }
    struct arithexpr {
        char dtype;
        char operator;
        struct variable des,op1,op2;
};
struct functioncall
{
    char fid;
    int arglist[8]; list of index to variables array in ds section;
};
struct goto
{
    char type;
    int des; => offset in cs->inst
    char operator;
    int op1,op2;
};
```

Figure 5:
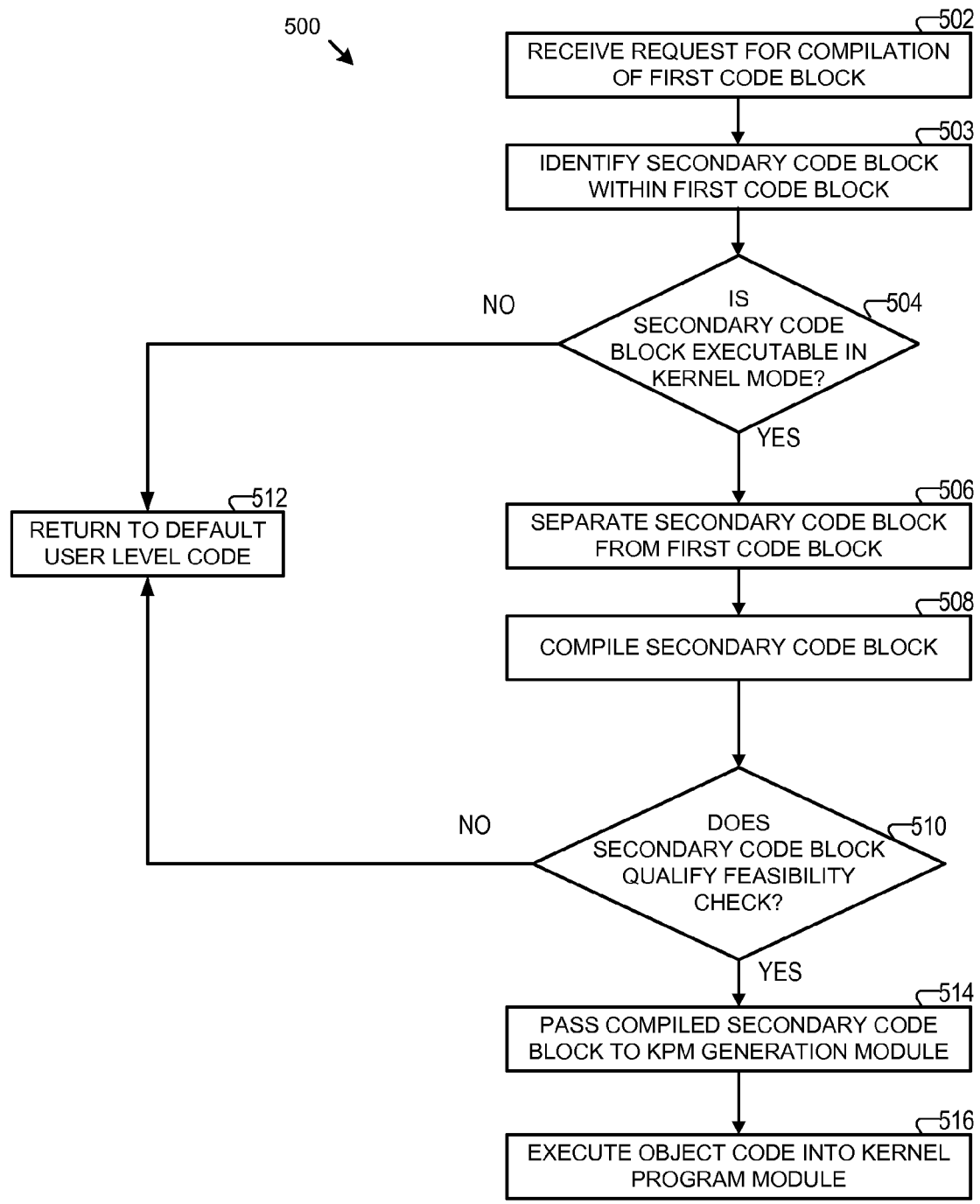
FIG. 5 illustrates an exemplary method for compiling operation of a high efficiency compilation framework according to the claimed invention.

FIG. 5 depicts an embodiment 500 of a method for the compiling operation of the high efficiency compilation framework 300. At step 502, the compiler 306 receives a request for compilation of a first code block from a user application. The compiler 306 forwards the first code block to the pattern identification module 316 for further analysis. At step 503, the pattern identification module 316 identifies a specific pattern (or second code block) within the first code block. In one embodiment there may be multiple second code blocks. At step 504, if the pattern identification module 316 determines that the second code blocks are suitable for execution in the kernel mode 304, the compiler 306 automatically tags the identified second code blocks, from start point to end point, separately (step 505). Subsequently, at step 506, the compiler 306 separates the second code blocks from the first code block for further processing, based on the tagging.

Thereafter, the compiler 306 instructs the intermediate code generation module 318 to compile the separated second code blocks at step 508, and perform a feasibility check on the separated second code blocks at step 510. However, a person skilled in the art will appreciate that the compiler 306 compiles the first code block separately in a conventional manner. The intermediate code generation module 318 starts compiling the separated second code blocks and simultaneously runs a feasibility check on the separated second code blocks, at compile time. The intermediate code generation module 318 compiles the separated second code blocks into corresponding object code modules.

During the feasibility check operation, the compiler 306, in conjunction with the intermediate code generation module 318, verifies all variable references within the separated second code blocks to ensure safe duplication of these variable references is possible in the kernel mode 304. It will be appreciated by person of skill in the art that a feasibility check may include various techniques to facilitate detection of dangerous programming practices, poor use of language features, or potential errors in source code, and so forth, with or without actually running the code.

If the separated second code blocks do not pass the feasibility check at step 510, the control flow of the first code block branches back to its default user level code, at step 512. If the separated second code blocks do pass the feasibility check at step 510, the compiler 306 at step 514, passes the object code modules for corresponding second code blocks to the KPM generation module 310. Thereafter, at step 516, the KPM generation module 310 executes the object code modules into KPMs, in a kernel mode recognizable format.

The KPM generation module 310 generates a unique KPMs corresponding to each second code block. The KPM, as defined in the preceding sections, includes a copy of values or data areas related to each second code block, in a kernel recognizable format. The KPM generation module 310 may further include performing a runtime feasibility check on the object code modules.

Figure 6:
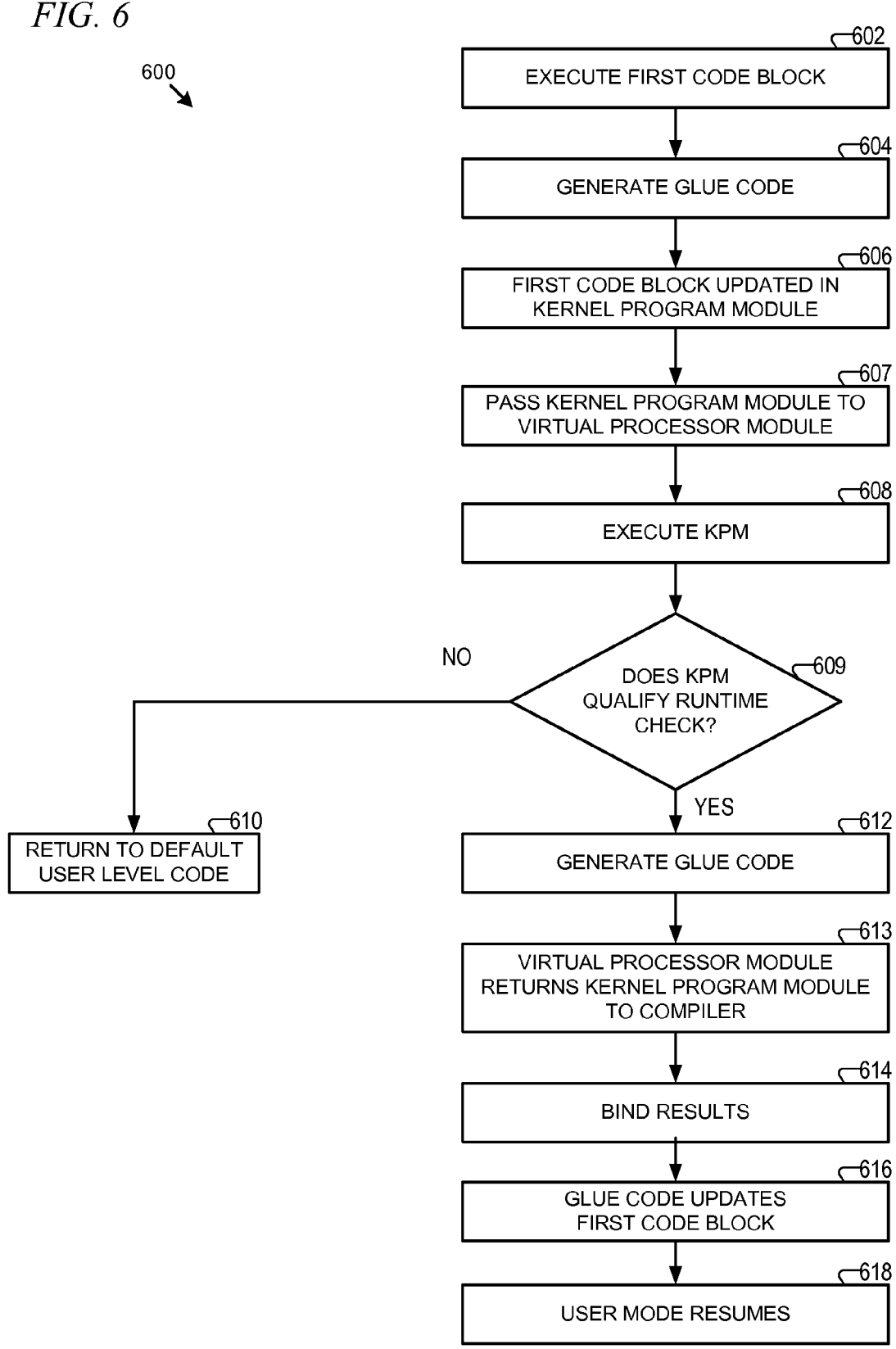
FIG. 6 illustrates an exemplary method for runtime operation of a high efficiency compilation framework in the claimed invention.

FIG. 6 depicts a method 600 for the runtime operation of the high efficiency compilation framework 300. At step 602, a first code block is executed in a conventional manner, in the user mode 302. At step 604, the compiler 306 generates glue code and correspondingly the values of variable references getting modified during execution of the first code block in the user mode 302 are updated into a kernel program module. The updating is performed by copying the required values of the variable references into the KPM using the glue code, in step 606. Thereafter, the compiler 306 passes the KPM as an argument to the virtual processor module 308, for further processing in step 607. It will be appreciated by a person of skill in the art that the KPM may be passed through a system call.

Thereafter, the virtual processor module 308 executes the KPM at step 608, and simultaneously initiates a runtime check on the KPM at step 608. The virtual processor module 308 executes each instruction, within a KPM, in an order specified in the code section of the kernel program module. It will be readily understood by a person having ordinary skill in the art that to the virtual processor module 308 may not execute instructions within a KPM in the order they are arranged in code section of the KPM. This deviation from the normal course of execution occurs when a program construct (second code block) has conditional statements, loops and mathematical operations. The virtual processor module 308 handles any deviation by checking results after executing one instruction at a time and then deciding the next instruction to be executed based on the execution of the former instruction. During the runtime check at step 609, the virtual processor module 308 determines whether the KPM corresponding to the object code module can be safely executed in the kernel mode 304. There may be situations, for example, an instruction initiating an infinite loop or similar events. If the KPM does not pass the runtime check at step 609, the virtual processor module 308 branches control flow of the first code block back to its default user level code at step 610.

If the KPM passes the runtime check at step 609, the virtual processor module 308 completes the execution of the kernel program module. Thereafter, at step 612, glue code is created to copy modified data values of variable references into the executed kernel program module. These modified values of variable references are created when the virtual processor module 308 executes the KPM. The glue code synchronizes the variable references being used in the second code blocks, including the data values corresponding to the variable references, such that the variable references of the first code block can be updated after the execution of the corresponding KPM in the kernel mode 304. At step 613, the virtual processor module 308 returns the executed KPM with modified variable reference values back to the compiler 306 in the user mode 302.

Thereafter, the compiler 306 binds results from the executed KPM and the executed first code block in the user mode 302, at step 614. It should be apparent to one skilled in the art that the glue code synchronizes and facilitates use of common variable references among the user mode 302 and the kernel mode 304. As soon as the execution is completed in the kernel mode, the glue code facilitates updating the first code block (being executed in the user mode), at step 616. Thereafter, execution in the user mode resumes at step 618. The memory is configured to enable transfer of data values of variables between a first code block being executed in the user mode 302 and a kernel program module being executed in the kernel mode 304.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method for accelerating execution of a first code block, comprising:
compiling the first code block to form a compiled first code block, including:
identifying a second code block within the first code block, wherein the second code block is suitable for kernel mode execution; and
separating the second code block from the first code block;
compiling the second code block into an object code module;

executing the object code module to create a kernel program module (KPM) that is recognizable by a system kernel;

generating glue code corresponding to the second code block, wherein the glue code is configured to copy data values of variables in the first code block to the kernel program module;

passing the kernel program module as an argument to a virtual processor module for kernel mode execution;

executing the first code block at run time, including:
executing the compiled first code block in user mode; and
copying required values of variables used in the first code block to the kernel program module;

executing the kernel program module in kernel mode to form results of a kernel program module execution;

returning the results of the kernel program module execution and modified data values of the kernel program module;

binding the results of the kernel program module execution and the modified data values of the kernel program module to the first code block; and updating the first code block using the glue code.

2. The computer implemented method of claim 1, wherein identifying the second code block within the first code block includes identifying a specific pattern in the first code block based, at least in part, on a predefined set of rules.

3. The computer implemented method of claim 2, wherein the predefined set of rules is user configurable.

4. The computer implemented method of claim 1, wherein compiling the second code block into the object code module includes performing a feasibility check.

5. The computer implemented method of claim 1, wherein executing the kernel program module in kernel mode includes performing a runtime check.

6. The computer implemented method of claim 1, wherein generating the glue code includes generating the glue code before passing the kernel program module as the argument to the virtual processor module in kernel mode.

7. The computer implemented method of claim 1, wherein the kernel program module includes interface definitions to facilitate execution of a code block apart from system calls.

8. The computer implemented method of claim 1, wherein the kernel program module comprises an object structure executable by the virtual processor module.

9. A system for execution of a first code block, the system comprising:
a processing unit;
a memory;
a compiler configured to compile the first code block to form a compiled first code block, including:
identifying a second code block within the first code block, wherein the second code block is suitable for kernel mode execution; and
separating the second code block from the first code block;
wherein the compiler is further configured to compile the second code block into an object code module;
a kernel program module (KPM) generation module configured to execute the object code module to create a kernel program module that is recognizable by a system kernel, wherein the compiler is further configured to generate glue code corresponding to the second code block, wherein the glue code is configured to copy data values of variables in the first code block to the kernel program module;
a virtual processor module configured to accept the kernel program module as an argument and to execute the kernel program module in kernel mode to form results of a kernel program module execution, wherein the compiler is further configured to execute the first code block at run time, including:
executing the compiled first code block in user mode; and
copying required values of variables used in the first code block to the kernel program module;
wherein the virtual processor module is further configured to return the results of the kernel program module execution and modified data values of the kernel program module;
wherein the glue code is further configured to bind the results of the kernel program module execution and the modified data values of the kernel program module to the first code block; and
wherein the glue code is further configured to update the first code block.

10. The system of claim 9, wherein the memory is further configured to enable transfer of data values of variables between the first code block being executed in user mode and the second code block being executed in kernel mode.

11. The system of claim 9, wherein the compiler comprises:
a pattern identification module configured to identify the second code block based, at least in part, on a predefined set of rules; and
an intermediate code generation module configured to compile the second code block into the object code module.

12. The system of claim 9, wherein the virtual processor module is further configured to execute the kernel program module in kernel mode, and wherein the virtual processor module comprises an interpreter.

13. The system of claim 9, wherein the kernel program module generation module comprises a processor configured to transform the object code module into the kernel program module.

14. The system of claim 9, wherein the kernel program module includes a variable linkage section, a data section, and a code section.

15. A method for accelerating the execution of a first code block of a computer program in a computing system environment, wherein computer programs execute in user mode (non-privileged mode) and kernel mode (privileged mode), and wherein the first code block is compiled separately into object code for execution in user mode and kernel mode respectively, the method comprising:
compiling the first code block to form a compiled first code block, including:
identifying a second code block within the first code block, wherein the second code block is suitable for kernel mode execution; and
separating the second code block from the first code block;
compiling the second code block into an object code module;
executing the object code module to create a kernel program module (KPM) that is recognizable by a system kernel;
generating glue code corresponding to the second code block, wherein the glue code is configured to copy data values of variables in the first code block to the kernel program module;

passing the kernel program module as an argument to a virtual processor module in kernel mode;
executing the first code block at run time, including:
  executing the compiled first code block in user mode; and
  copying required values of variables used in the first code block to the kernel program module;
executing the kernel program module on the virtual processor module in kernel mode to form results of a kernel program module execution;
returning the results of the kernel program module execution and modified data values of the kernel program module;
binding the results of the kernel program module execution and the modified data values of the kernel program module to the first code block; and
updating the first code block using the glue code.

16. The method of claim 15, wherein identifying the second code block within the first code block includes identifying a specific pattern in the first code block based, at least in part, on a predefined set of rules.

17. The method of claim 15, wherein compiling the second code block into the object code module includes performing a feasibility check.

18. The method of claim 15, wherein executing the kernel program module on the virtual processor module in kernel mode includes performing a runtime check.

19. The method of claim 15, wherein generating the glue code includes generating the glue code before passing the kernel program module as the argument to the virtual processor module in kernel mode.

20. The method of claim 15, wherein generating the glue code includes generating the glue code after passing the kernel program module as the argument to the virtual processor module in kernel mode.

* * * * *